(12) United States Patent
Rothschild (10) Patent No.: US 7,974,264 B2
(45) Date of Patent: Jul. 5, 2011

(54) METHOD AND A SYSTEM FOR DETERMINING THE SPATIAL LOCATION OF NODES IN A WIRELESS NETWORK

(76) Inventor: Michael Rothschild, Ramot Hashavim (IL)

( * ) Notice: Subject to any disclaimer, the term of this patent is extended or adjusted under 35 U.S.C. 154(b) by 564 days.

(21) Appl. No.: 12/171,853

(22) Filed: Jul. 11, 2008

(65) Prior Publication Data
US 2009/0028092 A1    Jan. 29, 2009

Related U.S. Application Data

(60) Provisional application No. 60/949,567, filed on Jul. 13, 2007, provisional application No. 60/988,284, filed on Nov. 15, 2007.

(51) Int. Cl.
*H04J 3/06* (2006.01)
(52) U.S. Cl. .................................... 370/350; 370/508
(58) Field of Classification Search .................. 370/350, 370/508; 455/456.1
See application file for complete search history.

(56) References Cited

U.S. PATENT DOCUMENTS

| | | | | |
|---|---|---|---|---|
| 7,120,090 | B2 * | 10/2006 | Smith | 368/10 |
| 7,382,804 | B2 * | 6/2008 | Alapuranen et al. | 370/509 |
| 7,574,216 | B2 * | 8/2009 | Leitch et al. | 455/456.1 |
| 2004/0005902 | A1 | 1/2004 | Belcea | |

FOREIGN PATENT DOCUMENTS

WO    WO 2005/081012    9/2005

* cited by examiner

*Primary Examiner* — Melvin Marcelo
(74) *Attorney, Agent, or Firm* — Merchant & Gould P.C.

(57) ABSTRACT

A method determines the propagation delays between nodes in a network, the network including a plurality of nodes. The method includes recording by each one of the nodes the transmission time of a beacon-signal respective of the one of the nodes and the reception times of other beacon-signals respective of other nodes. The beacon signal and the other beacon signals are transmitted according to a forward transmission sequence, a reverse transmission sequence is determined according to the forward transmission sequence. The procedure of recording for beacon signals is repeated and transmitted according to the reverse transmission sequence, and a propagation delay is determined between each pair of communicating nodes according to a forward propagation delay and a reverses propagation delay respective of the each of pair of communicating nodes. The forward propagation delay and the reverse propagation delay are determined according to the recorded times of transmissions and receptions of the beacon signals by the respective nodes. The pair of communicating nodes are defined as a pair of nodes that can receive transmissions of each other, and the time difference between transmissions of beacon signals respective of two nodes, during the forward transmission sequence, is substantially the same as the time difference between transmissions of the beacon signals respective of the two nodes, during the reverse transmission sequence.

9 Claims, 7 Drawing Sheets

METHOD AND A SYSTEM FOR DETERMINING THE SPATIAL LOCATION OF NODES IN A WIRELESS NETWORK

FIELD OF THE DISCLOSED TECHNIQUE

The disclosed technique relates to networks in general, and to methods and systems for determining the relative location of nodes in a network in particular.

BACKGROUND OF THE DISCLOSED TECHNIQUE

Determining the location of nodes, in a wireless communication network (e.g., an ad-hoc communication network), can facilitate the association of the information transmitted by each node, to the spatial location of each node either in the network or in a geographical coordinate system or in both. For example, in an emergency situation, the location of rescue teams, ambulances and fire trucks, may provide valuable information regarding the progression of the rescue operations. In a military environment, the location of troops or vehicles helps the commander to determine the best course of action. In cellular networks, the location of a node may be of interest to other users (e.g., friends of the person possessing the phone or tracking a stolen phone).

A known in the art method, for determining the geographical location of a node in a wireless network, includes coupling each node with a Global Positioning System (GPS) and have the node transmit the geographical location determined by the GPS. A known in the art method, for determining the relative location of a node in the network, includes determining the Time Of Arrival (TOA) of a transmitted signal from another node. According to this method, a first node transmits a first signal to a second node and records the time of transmission. The second node receives this first signal and records the time of reception. Thus, the transmission propagation delay between the nodes can be determined according to the recorded times of transmission and reception. Multiplying the determined transmission propagation delay by the propagation speed yields the relative distance between the nodes. When the relative distance between a plurality of network nodes is known, the relative location of the nodes in the network can be determined, for example, by using trilateration.

Figure 1:
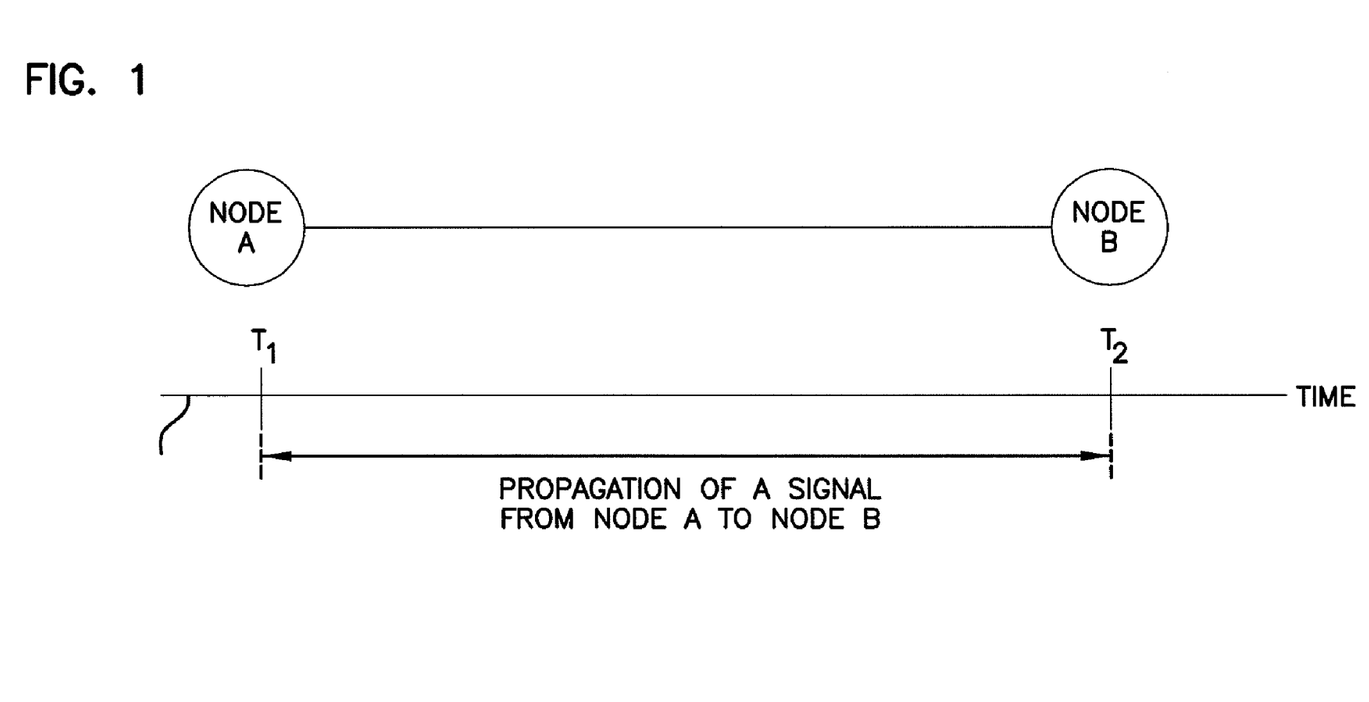
FIG. 1 is a schematic illustration of the transmission of signals according to the TOA method which is known in the art.

Reference is now made to FIG. 1, which is a schematic illustration of the transmission of signals according to the TOA method which is known in the art. Line 10 represents time. At time $T_1$, node A transmits a signal to node B and records time $T_1$. Node B receives the signal at time $T_2$, and records time $T_2$. When the clocks of node A and node B are synchronized (i.e., the clocks do not exhibit a relative clock-shift and clock-drift therebetween), the propagation time, $TP_{AB}$, of a signal between node A and node B is determined according to:

$$TP_{AB} = T_2 - T_1 \quad (1)$$

Multiplying the propagation time $TP_{AB}$ by the propagation speed C, results in the distance, $R_{AB}$, between node A and node B.

$$R_{AB} = TP_{AB} * C \quad (2)$$

Thus, by determining the distances to several adjacent nodes, each node in the network can determine the location thereof, relative to the other nodes in the network (e.g., by employing triangulation).

PCT publication WO 2005/081012, to Cheok et al, entitled "Ultra Wide Band Navigation System With Mobile Base Stations", directs to a method for determining the location of a target by using closed-from triangulation with three of more mobile base stations. According to the method directed to by Cheok, four base stations are used, and the location of these base stations, relative to each other, is determined. A target determines the location thereof, relative to these base stations, according to signals received form the four base stations. In one embodiment directed to by Cheok, the base stations and the target determine the relative locations thereof according to the TOA method. According to another embodiment directed to by Cheok, the base stations and the target determine the relative locations thereof according to the Time Difference Of Arrival method (TDOA).

According to the TDOA, a designated base station transmits an initial signal at time $T_0$. When the other base stations receive this signal, the base stations (i.e., including the designated base station) wait for a predetermined time period $T_{Di}$ (i.e., the time delay is different for each base station designated by i). Thereafter, each base station transmits a signal associated therewith. The target unit receives the signal from the base station and clocks the time the signals are received. The time difference between the time the target unit received each signal from each base station, and the time the designated station transmitted the initial signal is related to the distance between the target unit and the base station transmitting the signal. However, the geometrical relationships, between the target unit and the base stations, are non-linear. According to the method directed to by Cheok et al, the range differences, between the target unit and the designated base station, and between the target unit and each one of the other base station, is used to reduce the non-linear relationships to linear relationships.

U.S. application publication US 2004/0005902 to Belcea, entitled "System and Method for Correcting the Clock Drift and Maintaining the Synchronization of Low Quality Clocks in Wireless Networks", directs to a method for calculating the clocks shift, clock drift and propagation delay values using series of message exchanges. According to the method directed to by Balcea, A node, A, transmits a message to another node, B, at time $t_A^1$ (i.e., according to the clock of node A) corresponding to time $t_B^1$ at node B, $t_B^1$ is equal to $t_A^1$ plus the time shift between the clocks of node A and node B, $\Delta_{AB}$. At time $t_B^2$, node B receives the message transmitted by node A. At time $t_B^3$, node B responds to the message sent by node A with a first message containing the value of the clock, at node B, when the message from node A was received (i.e., $t_B^2$). The message from node B is received at node A at $t_A^4$. Shortly after node B transmits the first message, node B transmits a second message containing the clock value, at node B, when the first message, form node B to node A, was transmitted (i.e., $t_B^3$). Node A now has information relating to $t_A^1, t_B^2, t_B^3$ and $t_A^4$. Node A determines the values of the clock shift and the propagation delay between node A and node B according to:

$$t_A^4 - t_B^3 = -\Delta_{BA} + p_{BA} \quad (3)$$

$$t_B^2 - t_A^1 = \Delta_{BA} + p_{AB} \quad (4)$$

Where $\Delta_{BA}$ is the clock shift between node B and node A and $p_{AB}$ is the propagation delay between node A and node B. It is assumed that the propagation between node B to node A, $p_{BA}$, is also $p_{AB}$. Thus, solving two equations (i.e., equations (3) and (4)) with two unknowns (i.e., $\Delta_{BA}$ and $p_{AB}$) yields the clock shift and the propagation delay between node A and node B. By repeating the process every predetermined time period, the clock drift (i.e., the rate of change of the clock shift) between node A and node B is determined.

SUMMARY OF THE PRESENT DISCLOSED TECHNIQUE

It is an object of the disclosed technique to provide a novel method and system for determining the spatial location of nodes in a wireless network.

In accordance with the disclosed technique, there is thus provided a method for determining the propagation delays between nodes in a network. The network includes a plurality of nodes. The method includes the procedures of recording, by each one of the nodes, the transmission time of a beacon-signal respective of one of the nodes and the reception times of other beacon-signals respective of other nodes. The beacon signal and the other beacon signals are transmitted according to a forward transmission sequence. The method further includes the procedures of determining a reverse transmission sequence according the forward transmission sequence and repeating the procedure of recording for beacon signals transmitted according to the reverse transmission sequence. The method further includes the procedure of determining a propagation delay between each pair of communicating nodes according to a forward propagation delay and a reverses propagation delay respective of each of pair of communicating nodes. The forward propagation delay and the reverse propagation delay are determined according to the recorded times of transmissions and receptions of the beacon signals by the respective nodes. The pair of communicating nodes is defined as a pair of nodes that can receive transmissions of each other. The time difference between transmissions of beacon signals respective of two nodes, during the forward transmission sequence, is substantially the same as the time difference between transmissions of the beacon signals respective of the two nodes, during the reverse transmission sequence.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique, overcomes the disadvantages of the prior art, by providing a method and a system for determining transmission propagation delays between pairs of communicating nodes in a wireless network of nodes (i.e., a pair of nodes that can receive transmissions of each other), with the effects of clock-shifts and clock-drifts, between the clocks of the nodes, alleviated. The relative distances between each pair of communicating nodes, and consequently the geometrical structure of the network of nodes is determined according to the propagation delays.

According to the disclosed technique, the propagation delay between each pair of communicating nodes in the network is determined twice, once during a forward cycle and once during a reversed cycle. During the forward and reverse cycles, each node transmits a respective beacon-signal. In order to alleviate the effects of the clock drift on the determined propagation delays between the nodes, the time-period between the transmissions of beacon-signals, respective of the two nodes, is substantially the same in both cycles. Therefore, during the forward cycle, each node transmits the respective beacon-signal thereof according to the forward transmission sequence. During the reversed cycle, each node transmits the respective beacon-signal thereof according to a reversed transmission cycle, determined according to the forward transmission sequence. The time durations of the forward and reverse cycles are the same. Furthermore the rate of transmission of beacon-signals is also the same in both cycles. Each node records the times of transmission of the respective beacon-signal. Each node further records the times of reception of beacon-signals respective of other nodes. Each node transmits a time-record message, including information relating to these recorded times, to a location determining node or nodes. The locations determining node associates between the time-records received from the nodes in each pair of communicating nodes. The locations determining node determines the transmission propagation delays, between each pair of communicating nodes, according to the time-records of transmission and reception of the beacon-signals, transmitted during the two cycles. The location determining node further determines the distance between a pair of communicating nodes according to the determined propagation delays. Thus, the location determining node determines the geometric structure of the nodes in the network according to the determined distances. Since each node transmits two beacon-signals, the number of transmissions required to determine the geometric structure of the nodes in the network increases linearly with the number of nodes. Furthermore, the clocks of the nodes in the network can be synchronized, relative to a determined reference clock according to the time-records of transmission and reception of the beacon-signals.

Figure 2A:
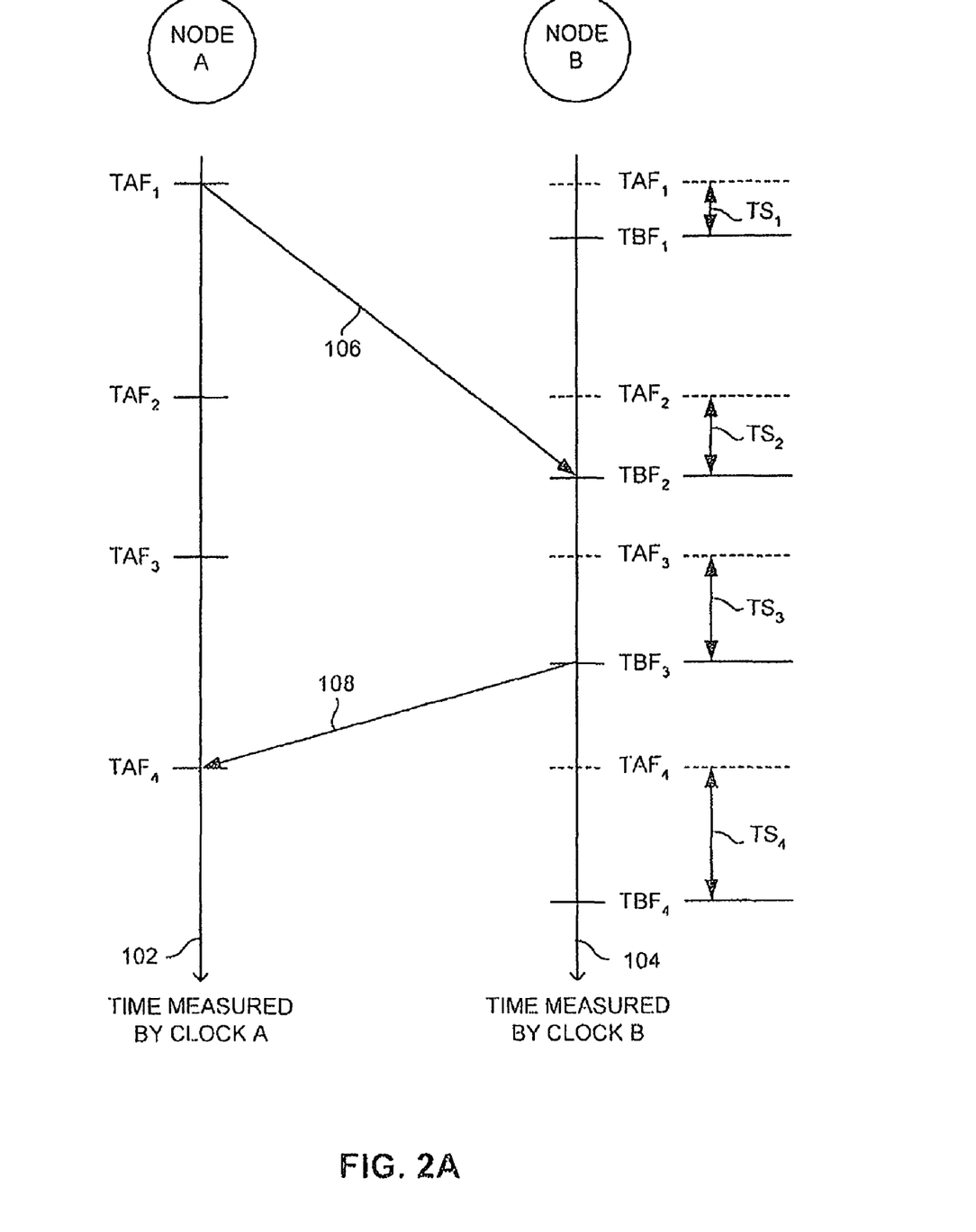
FIGS. 2A and 2B are schematic illustrations of two nodes in a wireless network of nodes, node A and node B, transmitting beacon-signals, for determining the transmission propagation delay therebetween in accordance with the disclosed technique.
Figure 2B:
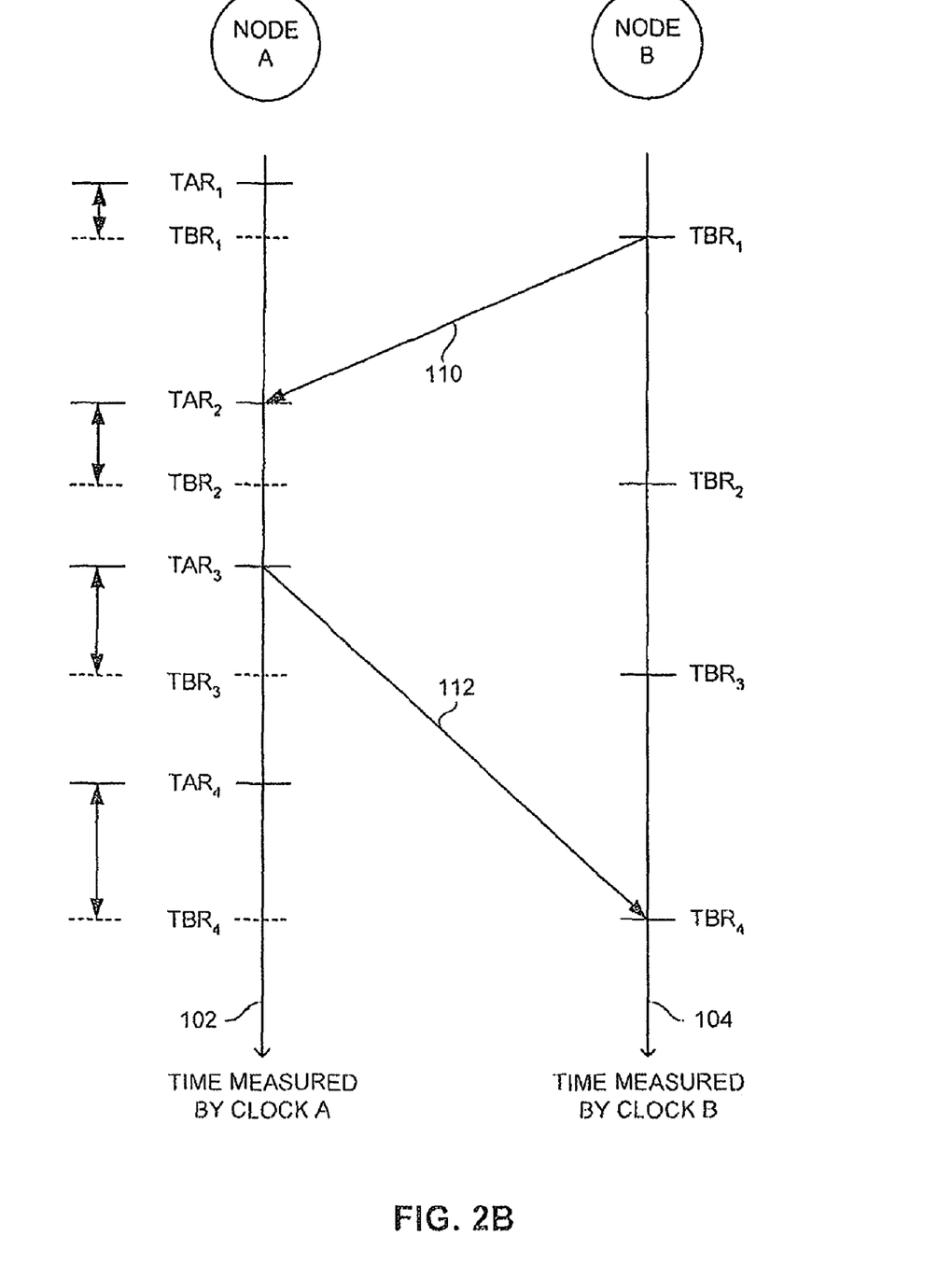

Reference is now made to FIGS. 2A and 2B, which are schematic illustrations of two nodes in a wireless network of nodes, node A and node B, transmitting beacon-signals, for determining the transmission propagation delay therebetween in accordance with the disclosed technique. FIG. 2A illustrates the forward cycle and FIG. 2B illustrates the reversed cycle. The progression of the clock in node A, referred herein as clock A, is represented by arrow 102 and the progression of the clock in node B, referred herein as clock B, is represented by arrow 104. The measurements made by clock A are designate by the letters TA and the measurements made by clock B are designated TB. The letter succeeding TA and TB represents the transmission cycle. The letter 'F' represents the forward cycle, and the letter 'R' represents the reversed cycle. The subscript represents the index of the measurement. For example, $TBR_4$ represents the fourth measurement (i.e., the subscript) made by clock B (i.e., TB) during the reversed cycle (i.e., R). Referring to FIG. 2A, at time $TAF_1$, node A transmits a respective beacon-signal, represented by arrow 106. Node A records time $TAF_1$ therein. Node B receives this beacon-signal, respective of node A, at time $TBF_2$ and records this time therein. At time $TBF_3$, node B transmits a respective beacon-signal, represented by arrow 108, and records time $TBF_3$ therein. Node A receives this beacon-signal respective of node B at time $TAF_4$ and records time $TAF_4$.

Clocks A and clock B exhibit a relative time-shift and time-drift there between. When node A transmits the respective beacon-signal thereof at time $TAF_1$, the time-shift between the clocks of node A and node B is $TS_1$. When node B receives the beacon-signal, respective of node A at time $TBF_2$, the time shift is $TS_2$. When node B transmits the respective beacon-signal there at time $TBF_3$, the time-shift is $TS_3$. When node A receives the beacon signal, respective of node B, the time-shift is $TS_4$.

Referring to FIG. 2B, at time $TBR_1$, node B transmits a respective beacon-signal to node A, represented by arrow 110. Node B records time $TBR_1$ therein. Node A receives this beacon-signal at time $TAR_2$ and records this time therein. At time $TAR_3$, node A transmits a respective beacon-signal, represented by arrow 108, to node B. Node B receives this beacon-signal, respective of node A, at time $TBR_4$ and records time $TBR_4$. It is noted that that the time-period between the transmissions of beacon-signals, respective of two nodes, is substantially the same in both cycles (i.e., the difference between $TBF_3$ and $TAF_1$ is substantially equal to the difference between $TAR_3$ and $TBR_1$).

Both, node A and node B transmit, to a locations determining node (not shown in FIGS. 2A and 2B) time-record messages, including information relating to their respective time-records of beacon-signals transmission and reception times. Node A transmits to the locations determining node time-records $TAF_1$, $TAF_4$ measured during the forward cycle, and time-records $TAR_2$ and $TAR_3$ measured during the reversed cycle. Node B transmits to the locations determining node time-records $TBF_2$, $TBF_3$, measured during the forward cycle, and time-records $TBR_1$ and $TBR_4$ measured during the reversed cycle. Alternatively, when no clock synchronization is needed each node transmits to the locations determining node only the time differences between the transmissions and receptions of beacon-signals, thus reducing the amount of transmitted information. The locations determining node associates the time-records received from node A with the time-records received from node B (i.e., since node A and node B are a pair of communicating nodes). The location determining node may be either node A or node B or another node in the network (not shown in FIGS. 2A and 2B). The location determining node determines the forward propagation delay between node A and node B, represented by $FP_{AB}$, according to:

$$FP_{AB} = \frac{(TAF_4 - TAF_1) - (TBF_3 - TBF_2)}{2} \quad (5)$$

The location determining node determines the reverse propagation delay, between node B and node A, represented $RP_{BA}$, according to:

$$RP_{BA} = \frac{(TBR_4 - TBR_1) - (TAR_3 - TAR_2)}{2} \quad (6)$$

It is noted that, in equation (5) and (6), the forward and reverse propagation delays are determined according to the differences in time measurements made by the same clock. Therefore, the determined forward and reverse propagation delays are not affected by the shift between the clocks. However, the forward and reverse propagation delays may be different due to the clock-drift between the clock of node A and the clock of Node B. The location determining node or nodes determines the propagation delay between node A and node B, represented by $P_{AB}$, by averaging the forward and reverse propagation delays according to:

$$P_{AB} = \frac{FP_{AB} + RP_{BA}}{2} \quad (7)$$

thus alleviating the effects of the clock-drift between the clock of node A and the clock of node B.

Table 1 and 2 are examples of the time measurements made by node A and node B. Table 1 illustrates the time measurements made during the forward cycle. Table 2 illustrates the time measurements made during the reversed cycle. The times in square brackets represent the time at the node not performing the time measurement. In the following example the time-shift between the two clocks is 1 hour, and the time drift is 1 sec/min. The propagation delay between the nodes is 1 min.

TABLE 1

| Event | Time at Node A | Time at Node B |
|---|---|---|
| Node A transmitting a beacon-signal - $TAF_1$ | 4:00:00 | [5:00:00] |
| Node B receiving a beacon-signal from node A - $TBF_2$ | [4:01:00] | 5:01:01 |
| Node B transmitting a beacon-signal - $TBF_3$ | [4:09:50] | 5:10:00 |
| Node A receiving a beacon-signal from node B - $TAF_4$ | 4:10:50 | [5:11:01] |
| $FP_{AB}$ = [(4:10:50 − 4:00:00) − (5:10:00 − 5:01:01)]/2 = (0:10:50 − 0:8:59)/2 = 0:01:51/2 = 0:00:55.5 | | |

TABLE 2

| Event | Time at Node A | Time at Node B |
|---|---|---|
| Node B transmitting a beacon-signal - $TBR_1$ | [4:59:00] | 6:00:00 |
| Node A receiving beacon-signal from node B - $TAR_2$ | 4:59:59 | [6:01:00] |
| Node A transmitting a beacon-signal - $TAR_3$ | 5:10:00 | [6:11:10] |
| Node B receiving a beacon-signal from node A - $TBR_4$ | [5:10:59] | 6:12:10 |
| $RP_{BA}$ = [(6:12:10 − 6:00:00) − (5:10:00 − 4:59:59)]/2 = [0:12:10 − 0:10:01]/2 = 00:02:09/2 = 0:01:04.5 | | |

$P_{AB}$=[0:01:04.5+0:00:55.5]/2=0:01:00

As mentioned above, the clocks of node A and node B may be synchronized (i.e., corrected for the relative clock-shift and clock-drift) according to the time-records respective of each node. The relationship between the transmission and reception times of the beacon-signals transmitted during the forward cycle, the propagation delay, the clock-shift and the clock-drift, is given by:

$$RFB = TFA + S1 + P_{AB} + D_B P_{AB} \quad (8)$$

$$RFA = TFB - D_B \Delta t + D_A \Delta t - S1 + P_{AB} + D_A P_{AB} \quad (9)$$

wherein S1 is the clock-shift between the clock of node A and the clock of node B when node A transmits the beacon-signal thereof during the forward cycle, $P_{AB}$ is the propagation delay, $D_A$ is the clock-drift between the clock of node A and absolute time unit (i.e., absolute time unit as determined by the speed of light), $D_B$ is the clock-drift between the clock of node B and absolute time unit and Δt is the time difference between the time node A transmitted the respective beacon-signal thereof and the time B transmitted the respective beacon-signal thereof. Furthermore, TFA is the time node A transmits the respective beacon-signal thereof during the forward cycle according to the clock of node A (e.g., $TAF_1$ in FIG. 2), RFB is the time node B received the beacon-signal, transmitted by node A during the forward cycle, according to the clock of node B, TFB is the time node B transmits the respective beacon-signal thereof during the forward cycle according to the clock of node B and RFA is the time node A received the beacon-signal transmitted by node B during the forward cycle, according to the clock of node A.

The relationship between the transmission and reception times of the beacon-signals transmitted during the reversed cycle, the propagation delay, the clock-shift and the clock-drift is given by:

$$RRA = TRB - S2 + P_{AB} + D_A P_{AB} \quad (10)$$

$$RRB = TRA + S2 + P_{AB} + D_B P_{AB} + D_B \Delta t - D_A \Delta t \quad (11)$$

wherein S2 is the clock-shift between the clock of node B and the clock of node A when node B transmits the respective beacon-signal thereof during the reversed cycle, TRB is the time node B transmits the respective beacon-signal thereof during the reversed cycle according to the clock of node A, RRA is the time node A received the beacon-signal transmitted by node B during the reversed cycle, according to the clock of node A, TRA is the time node A transmits the respective beacon-signal thereof, during the reversed cycle, according to the clock of node A and RRB is the time node B received the beacon-signal transmitted by node A during the reversed cycle according to the clock of node B. It is noted that Δt is the same in both equation (9) and equation (11) since, as mentioned above, the time-period between the transmissions of beacon-signals, respective of two nodes, is substantially the same in both cycles (i.e., the difference between TFB and TFA is substantially equal to the difference between TRA and TRB).

Defining the relative clock drift between the clock of node A and the clock of node B as $$D = D_B - D_a$$

and adding equation (8) to equation (9) and equation (10) to equation (11) yields the relationship between the time measurements (i.e., TFA, RFB, TFB, RFA, TRB, RRA, TRA, RRB), the propagation delay W and the relative clock-drift D.

$$P_{AB} - \frac{D\Delta t - P_{AB}(D_A + D_B)}{2} = \frac{(RFA - TFA) + (RFB - TFB)}{2} \quad (12)$$

$$P_{AB} + \frac{D\Delta t + P_{AB}(D_A + D_B)}{2} = \frac{(RRA - TRA) + (RRB - TRB)}{2} \quad (13)$$

Since the time measurements and Δt are known, the relative drift between the clock of node A and the clock of node B, D, and the propagation delay, $P_{AB}$, are determined as follows: Subtracting equation (13) from equation (12) and defining $$\frac{(RFA - TFA) + (RFB - TFB)}{2} \equiv FM \quad (14)$$

and $$\frac{(RRA - TRA) + (RRB - TRB)}{2} \equiv RM$$

yields $$D = \frac{RM - FM}{\Delta t}$$

substituting equation (14) into equation (13) yields $$P_{AB} = \frac{(RM + FM)/2}{1 + [(D_A + D_B)/2]} \quad (15)$$

Since D and $P_{AB}$ are known, S1 can be directly determined from equation (9) and S2 can be directly determined from equation (11). Thus, the clocks are synchronized according to the determined clock-shift and clock-drift. It is noted that the estimation of the propagation delay according to equation (15) is more accurate than the estimation of the propagation delay in equation (7) since equation (15) includes a second order error term (i.e., $(1+(D_A+D_B)/2)$). However, this second order term may be neglected when the values of $D_A$ and $D_B$ are substantially small and the effect thereof, on the determined distance between two nodes, is small (e.g., $D_A+D_B \ll 1$). Thus equation (15) reduces to equation (7). Furthermore, when the time period between the forward cycle and the reverse cycle is substantially larger than Δt, and that time period is known (i.e., the time separation between the two cycle is known), the estimation of the clock-drift may be improved. The estimation of the clock-drift may improved by determining the difference between S1 and S2 and dividing by the time elapsed between the measurements of S1 and S2. This clock-drift may be substituted in equation (15) for improving the estimation of the propagation delay. The improved estimations of the clock-drift and the propagation delay are substituted into equations (9) and (11) for improving the estimations of S1 and S2.

Figure 3:
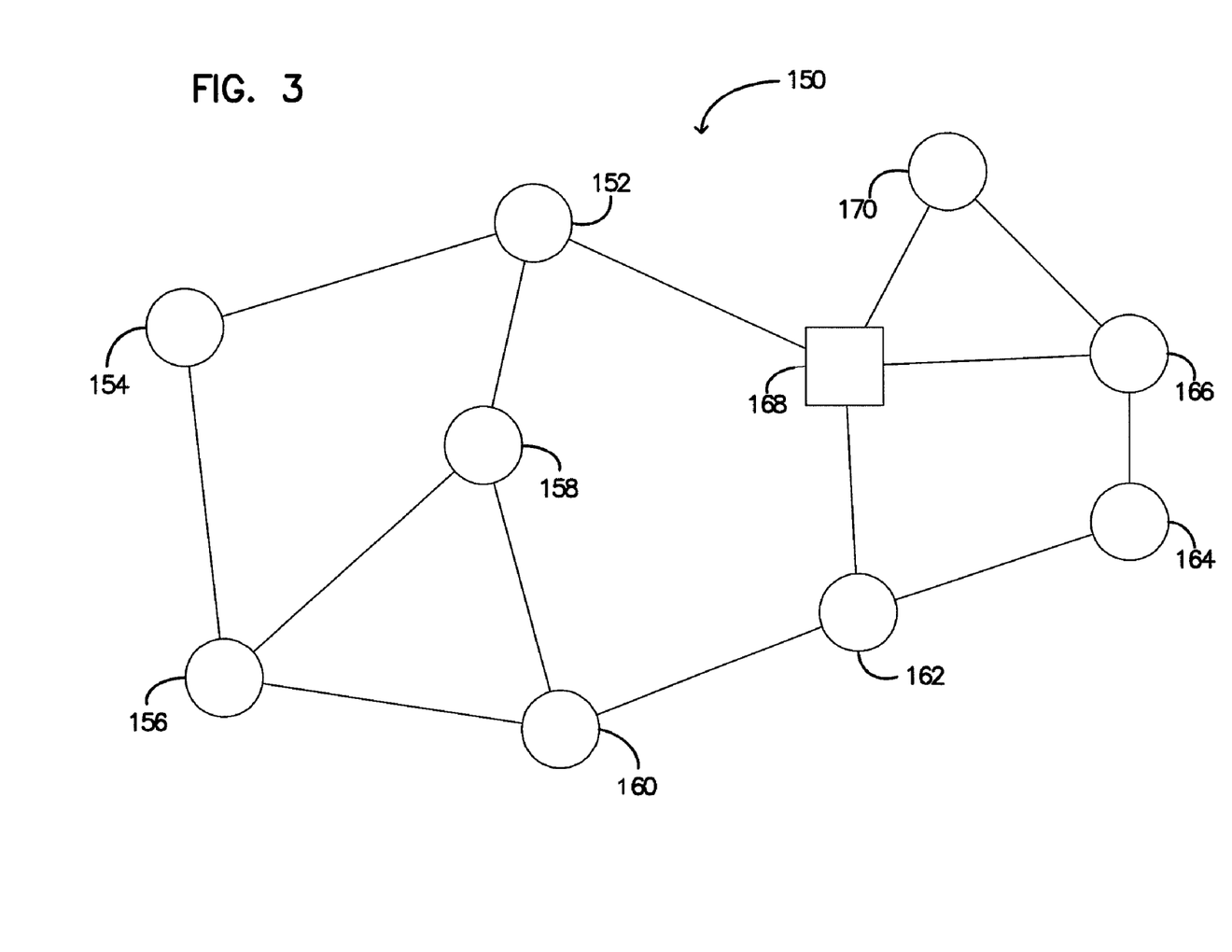
FIG. 3 is a schematic illustration of an exemplary network, in accordance with another embodiment of the disclosed technique.

Reference is now made to FIG. 3 which is a schematic illustration of an exemplary network, generally referenced 150, in accordance with another embodiment of the disclosed technique. Network 150 includes nodes, 152, 154, 156, 158, 160, 162, 164, 166, and 170 designated by circles and node 168 designated by a square. In FIG. 3, two circles, each designating a node, connected by a line, represents a pair of communicating nodes. The nodes in network 150 transmits the respective-beacon signals thereof twice, once during a forward cycle and once during a reverse cycle. As mentioned above, in order to alleviate the effects of the drift between the clocks of nodes in the network, on the determined propagation delays between the nodes, the time-period between the transmissions of beacon-signals, respective of two nodes, is substantially the same in both cycles. For example, during the forward cycle, the time between the transmission of the beacon-signal respective of node 152 and the transmission of the beacon-signal respective of node 154 is ΔT. Therefore, during the reverse cycle, the time between the transmission of the beacon-signal respective of node 154 and the transmission of the beacon-signal respective of node 152 will be substantially equal to ΔT. Accordingly, during the forward cycle, the nodes in network 150 transmit their respective beacon-signal according to a forward sequence. During the reversed cycle, the nodes in network 150 transmit their respective beacon-signals according to a reversed sequence, determined according to the forward sequence.

Each node records the time of transmission of the respective beacon-signal thereof, and the time of reception of beacon-signals respective of other nodes. Each of nodes 152, 154, 156, 158, 160, 162, 164, 166, and 170 transmit a time-record message, including information relating to the time-records thereof (i.e., time of transmission of the beacon-signal respective thereof, and the time of reception of beacon-signals respective of other nodes) to a locations determining node. In network 150, node 168 is the locations determining node. Locations determining node 168 associates between the time-records received from the nodes in each pair of communicating nodes. For example, location determining node associates the time-records received from node 158 with the time-records received from nodes 152, 156 and 160. Locations determining node 168 determines the propagation delay, between each pair of communicating nodes, with the effects of the clock-shifts and the clock-drifts alleviated, as describe hereinabove in conjunction with FIGS. 2A and 2B. Locations determining node 168 determines the distance between each pair of communicating nodes according to the determined propagation delays between these nodes. Locations determining node 168 further determines the geometric structure of the nodes in the network, according to the determined distances between each pair of communicating nodes (e.g., by using trilateration). It is noted that there can be more than one locations determining node in a network. When there is more than one location determining node, each of the locations determining nodes may determine the geometrical structure of a group of nodes in the network. For example, in network 150, node 158 may also be a locations determining node. Hence, locations determining node 168 determines the geometrical structure of nodes 152, 162, 164, 166, 168 and 170 and node 158 determines the geometrical structure of nodes 152, 154, 156, 158 and 160. It is further noted that the location determining node may not be a part of network 150.

The forward transmission sequence, and consequently the reversed transmission sequence, in which the nodes in network 150 transmit their respective location signals is arbitrary. For example, when the nodes transmit messages according to a Time Division Multiple Access (TDMA) scheme, the transmission sequence of beacon-signals may be determined according to the allocated transmission time of each node in the TDMA scheme. According to another alternative, when at least an estimation of the topology of the nodes in the network (i.e., the connectivity between the nodes) is known, the transmission sequence may be determined, for example, according to the hop distance (i.e., the number of nodes separating two nodes plus one) between each of the nodes and a selected one of the nodes. One exemplary forward transmission sequence may be as follows: node 168 transmits first. Thereafter the sequence of transmission is node 152, node 162, node 164, node 166, node 170, node 154, node 158, node 160 and node 156. Therefore, the reverse transmission cycle will be node 156, node 160, node 158, node 154, node 170, node 166, node 164, node 162 node 152 and node 168. It is noted that the time durations of the forward and reverse cycles are the same. Furthermore the rate of transmission of beacon-signals is also the same in both cycles.

According to yet another alternative, when the nodes in network 150 do not transmit according to a TDMA scheme (e.g., the nodes transmit according to a Code Division Multiple Access—CDMA or Frequency Division Multiple Access—FDMA), the transmission sequence in a transmission cycle (i.e., forward and consequently the backward transmission sequences) may be determined according to the identification representation (e.g., MAC ID number), referred to hereinafter as ID, of the nodes. The transmission sequence is defined according to the number of nodes in network 150 and the node initiating the transmission cycle.

Figure 4:
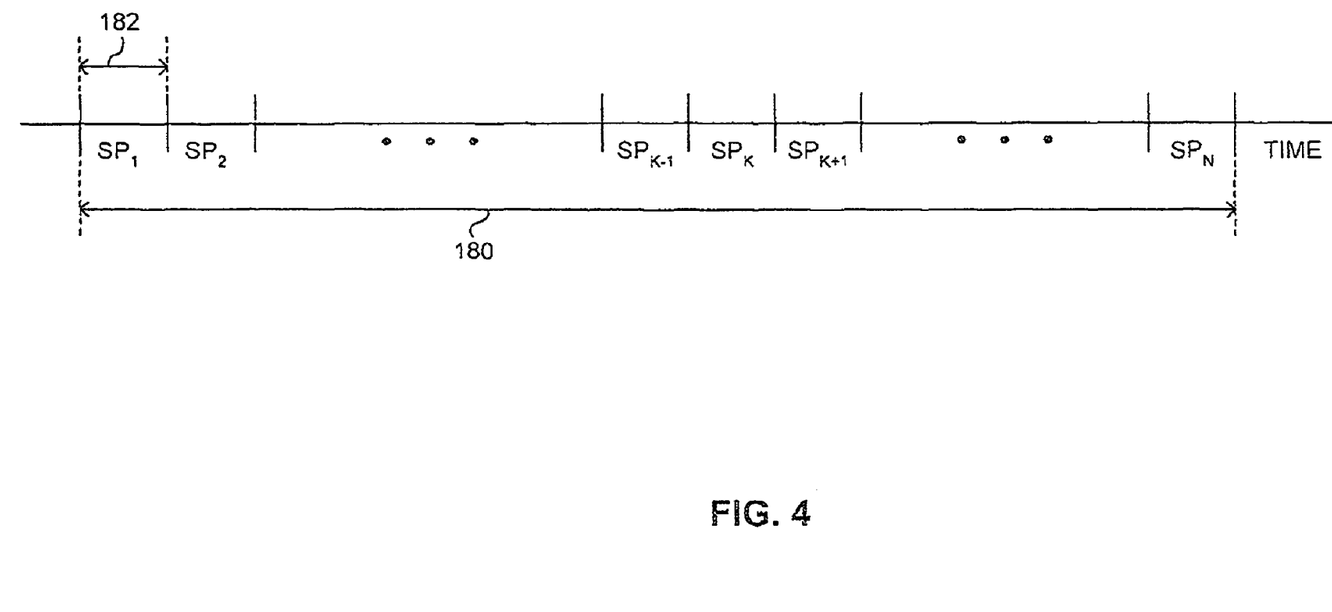
FIG. 4 is a schematic illustration of the time-period of a forward transmission cycle.

Reference is now made to FIG. 4 which is a schematic illustration of the time-period of a forward transmission cycle, and still referring to FIG. 3. Time-period 180 represents the time period of a forward transmission cycle. Time-period 182 represents the time-period in which a node transmits the respective beacon signal thereof, referred to herein a signal-period and denoted $SP_i$ in FIG. 4. Each node in network 150 may initiate a transmission cycle and transmit a respective beacon-signal. For example, when regarding the reference numerals of the nodes in FIG. 3 as the ID of the nodes, node 154 initiates a transmission cycle. Accordingly, node 154 transmits the respective beacon-signal thereof. Each node, with an ID value higher than the ID value of node 154, transmits the respective beacon-signal thereof, at signal-period corresponding to the difference between the ID values of the nodes, after node 154. Therefore, if node 154 transmits the respective beacon-signal thereof at $SP_2$ (FIG. 4—not shown), then, node 156, for example, transmits at $SP_3$.

However, the ID value of node 152 is lower than the ID value of node 154. Therefore, when the nodes in network 150 do not transmit according to a TDMA scheme, and the node with the lowest ID value does not initiate the transmission cycle, a plurality of forward and backward transmission cycles are required to increase the probability that all the nodes transmits the respective beacon-signals thereof. Accordingly, the beacon-signal of the node initiating the transmission cycles includes the ID value of that node and a maximum number of transmission cycles. Each node, with a lowest ID value than that of node 154, transmits the respective beacon-signal thereof at a signal-period corresponding to the difference between the ID's of the nodes before node 154 in consecutive transmission cycles (i.e., consecutive to the first transmission cycle).

When node 154 initiates the transmission cycle, node 154 transmits a beacon-signal including the ID thereof and a maximum number of transmission cycles (e.g., three transmission cycles). Nodes 156-170 transmit the respective beacon-signals thereof, after node 154, at the respective signal-period of each node (i.e., $SP_3$-$SP_{10}$, not shown in FIG. 4)). The beacon-signals of the nodes transmitting after node 154 include the ID value thereof and the remaining number of forward and backward cycles (i.e., three). Node 152 transmits the respective beacon signal thereof in the consecutive transmission cycles and includes the ID value thereof and the remaining number of forward and backward cycles (i.e., two). The nodes transmit the respective beacon-signal thereof until the number of remaining number of forward and backward cycles is zero. Thus, the transmission sequence of the nodes is determined according to the ID values of the nodes. The maximum number of forward and backward cycles depends on the distribution of the nodes in the network.

Nodes 156-170 transmit the respective beacon-signals thereof, after node 154, at the respective signal-period respective of each node, during the first cycle only when theses nodes received beacon-signals respective of nodes with a lower ID. As in the above example regarding node 152, when a node receive a beacon-signals respective of a node with a higher ID, then, the node with the higher ID transmits the respective beacon-signal thereof during the next transmission cycle. When the maximum number of transmission cycles is transmitted, each node transmits a time-record message to location determining node 168. Location determining node 168 estimates the relative locations of the nodes in network 150. Alternatively, the nodes may transmit the time-record message after each cycle.

As mentioned above, when at least an estimation of the topology of the nodes in the network (i.e., the connectivity between the nodes) is known, the transmission sequence may be determined, for example, according to the hop distance (i.e., the number of nodes separating two nodes plus one) a selected node and each of the remaining nodes (i.e., each node is assigned a new signal-period for transmitting the respective beacon-signal thereof). Therefore, after each cycle, the locations of the nodes that transmitted a respective beacon signal during that cycle, is used to determine a new transmission sequence. Thus the maximum number of required transmission cycles may be reduced.

Alternatively, the initiating node (i.e., node 154 in the above example) may transmit a commence-message indicating the start of a cycle to all the nodes in the network (e.g., transmitting the commence message as a flood message). Each node in network 150, receiving the commence message, determines the respective time-period for transmitting the respective beacon-signal thereof accordingly.

When the location of at least two nodes, in a two-dimensional geographical coordinate system and information relating to a third node (e.g., the location of the third node relative to a line between the two nodes) is known (e.g., according to previous cycles), then, locations determining node 168 determines the location of each node in the network in the two-dimensional geographical coordinate system. When the location of at least three nodes, in a three-dimensional geographical coordinate system and information relating to a fourth is known, then, locations determining node 168 determines the location of each node in the network in the three-dimensional geographical coordinate system.

Each node in network 150 transmits the beacon-signal respective thereof every determined time-period. Alternatively, each node in network 150 transmits the respective beacon-signal thereof according to received commence-message, indicating the start of a cycle. The location determining node transmits this commence-message. Alternatively, each node may transmit a commence-message, for example, when a node requires location information thereof, (e.g., a commander in the battlefield). In yet another alternative, the transmitter of the commence-message may not be a node in network 150. However, all the nodes in network 150 should directly communicate with the transmitter of the commence-message (i.e., irrespective if the transmitter of the commence-message is a part of network 150).

As mentioned above, the clocks of each pair of communicating nodes in the network 150 may be synchronized according to the measurements of the transmission and reception times of beacon-signals respective of those nodes. Thus, the clocks of all the nodes in network 150 may be synchronized, for example, according to a selected clock of one of the nodes according to the clock shifts and clock drifts (e.g., as determined according to equations (14), (10) and (11)).

Figure 5A:
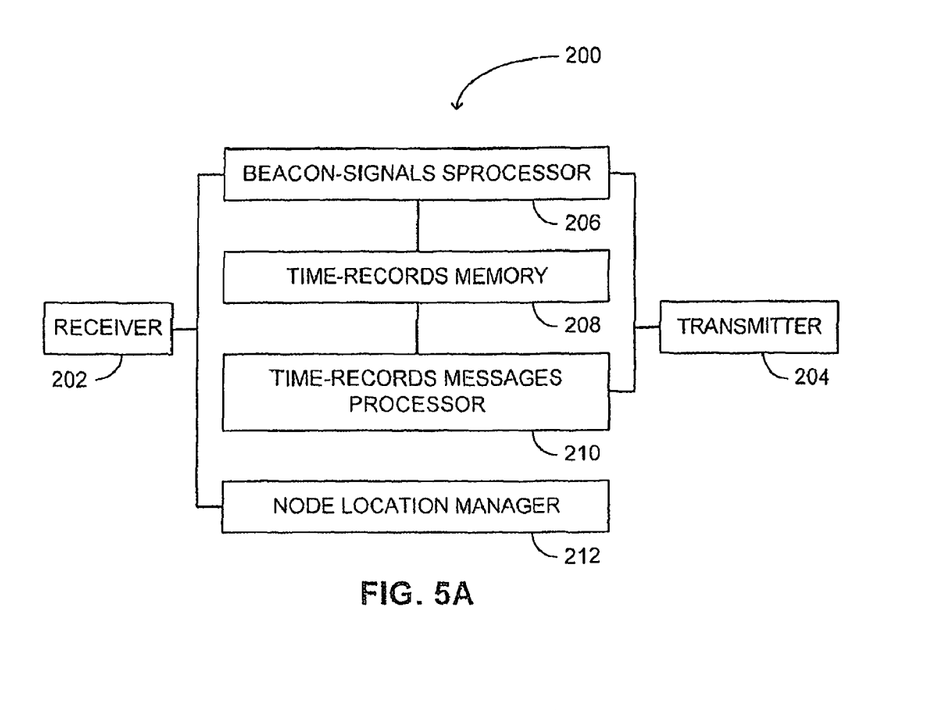
FIG. 5A is a schematic illustration of a node system, constructed and operative in accordance with a further embodiment of the disclosed technique.

Reference is now made to FIG. 5A, which is a schematic illustration of a node system, generally referenced 200, constructed and operative in accordance with a further embodiment of the disclosed technique. Node 200 is a part of a network (not shown) including a plurality of nodes. Node system 200 includes a receiver 202, a transmitter 204, a beacon-signals processor 206, a time-records memory 208, a time-records messages processor 210 and a node location manager 212. Times record memory 208 is coupled with beacon-signals processor 206 and with time-records messages processor 210. Beacon-signals processor 206 is further coupled with transmitter 202 and with receiver 204. Time-records messages processor 210 is further coupled with transmitter 204. Location determinator 212 is coupled with receiver 202.

Beacon-signal processor 206 transmits a beacon signal twice, once during a forward cycle, according to the position of the node in a forward transmission sequence, and once during a reverse cycle, according to the position of the node in a reverse transmission sequence. Beacon-signal processor 206 records the times of these transmissions in time-records memory 208. Beacon-signal processor 206 receives via receiver 202, during the forward and reverse cycles, beacon-signals respective of other nodes, and records the times of these receptions in time-records memory 208. Time-records messages processor 210 transmits, via transmitter 204, time-record messages, including the recorded times of transmissions and receptions of beacon signals, to a location determining node (not shown). Alternatively, Time-records messages processor 210 transmits, via transmitter 204, time-record messages, including only the time differences between the transmissions and receptions of beacon-signals. Node location manager 212 determines the spatial location of the node according to messages received, via receiver 202, from the locations determining node.

Figure 5B:
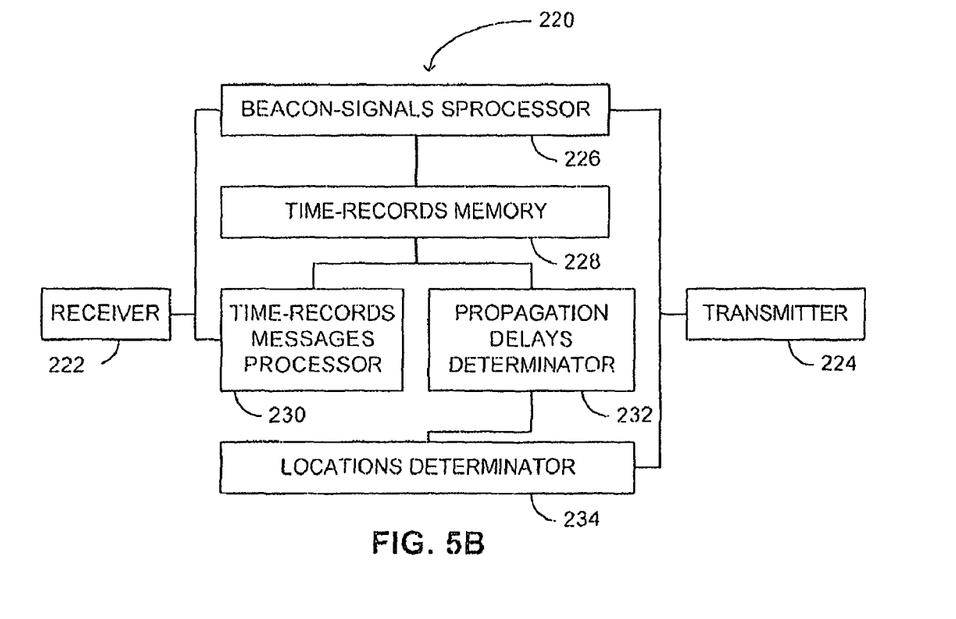
FIG. 5B, is a schematic illustration of a locations determining node system, constructed and operative in accordance with another embodiment of the disclosed technique.

Reference is now made to FIG. 5B, which is a schematic illustration of a locations determining node system, generally referenced 220, constructed and operative in accordance with another embodiment of the disclosed technique. Node 220 is a part of a network (not shown) including a plurality of nodes. Node 220 includes a transmitter 222, a receiver 224 a Beacon-signals processor 226, a time-records memory 228, a time-records messages processor 230, a propagations delay determinator 232 and a locations determinator 234.

Times record memory 228 is coupled with beacon-signals processor 206, with time-records messages processor 230 and with propagation delays determinator 232. Beacon-signals processor 226 is further coupled with receiver 222 and with transmitter 224. Time-record messages processor is further coupled with receiver 222. Propagation delays determinator is further coupled with locations determinator 232. Locations determinator 234 is coupled with transmitter 224.

Beacon-signal processor 226 transmits a beacon signal twice, once during the forward cycle, according to the position of the node in a forward transmission sequence, and once during the reverse cycle, according to the position of the node in a reverse transmission sequence. Beacon-signal processor 226 records the times of these transmissions in time-records memory 228. Beacon-signal processor 226 receives via receiver 222, during the forward and reverse cycles, beacon-signals respective of other nodes, and records the times of these receptions in time-records memory 228.

Time-records messages processor 230 receives, via receiver 222, time-record messages respective of other nodes in the network, and records these received time-records in Ume-records memory 228. Propagation delays determinator 232 associates between the time-records received from the nodes in each pair of communicating nodes. Propagation delays determinator 232 further determines the forward and reverse propagation delays respective of each pair of communicating nodes in the network according to the time-records stored in time-records memory 228. Propagation delays determinator 232 determines the propagation delays between pairs of communicating nodes, with the effects of clock-shifts and clock-drifts alleviated, by averaging the respective forward and reverse propagation delays. Locations processor 212 determines the spatial location of the each node in the network according to the determined propagation delays.

Figure 6:
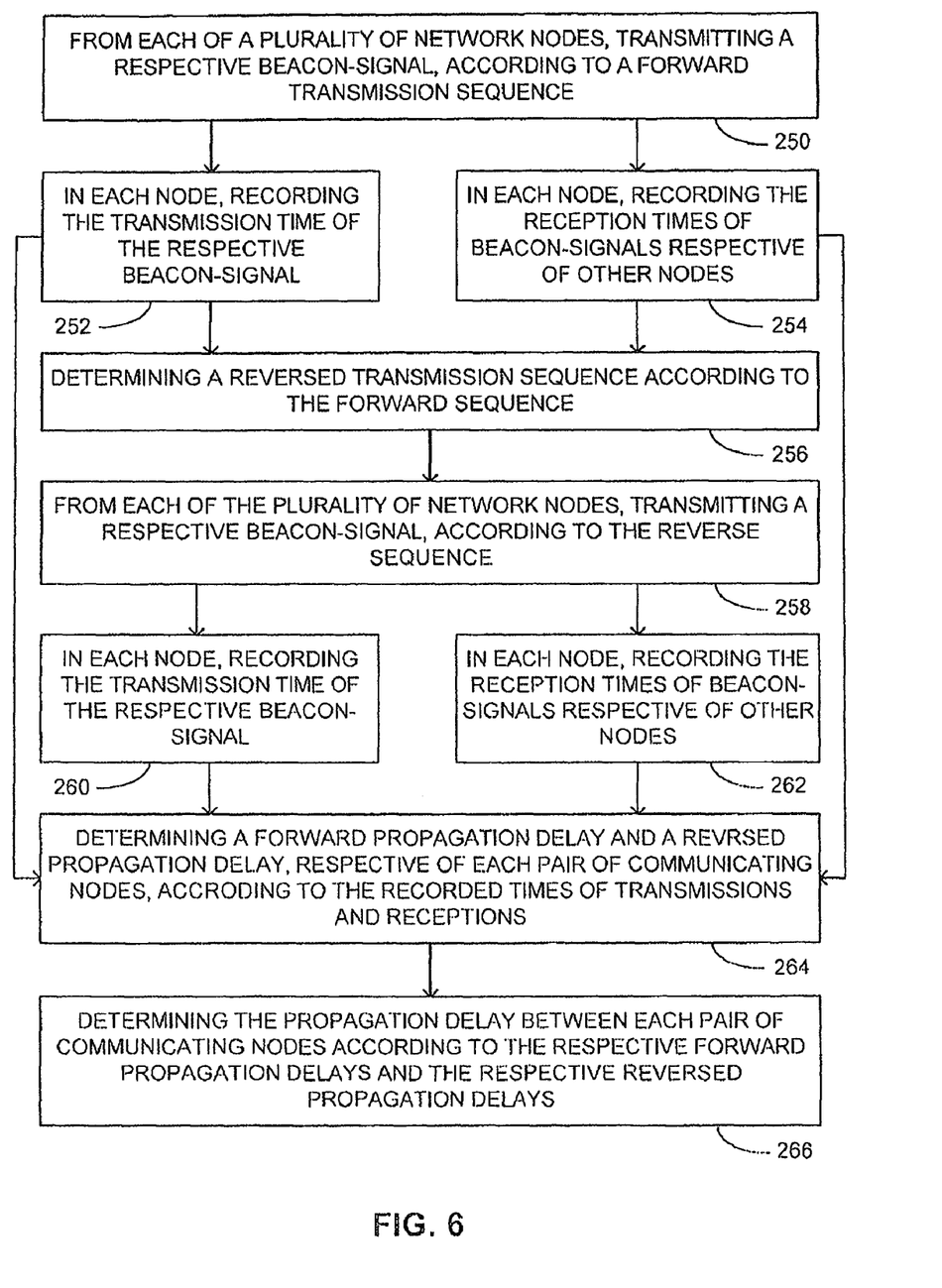
FIG. 6, is a schematic illustration of a method for determining the locations of nodes in a network, in accordance with a further embodiment of the disclosed technique.

Reference is now made to FIG. 6, which is a schematic illustration of a method for determining the locations of nodes in a network, in accordance with a further embodiment of the disclosed technique. In procedure 250, a beacon-signal, respective of each node of a plurality of network nodes, is transmitted according to a forward transmission sequence. The beacon-signal may be a dedicated beacon-signal or a signal transmitted by each node according to a network protocol (e.g., a 'hello' message). As mentioned above the transmission sequence is arbitrary and may be determined according to the ID of the nodes, the allocated transmission time of each node in a TDMA scheme or the hop distance of the node relative to the node transmitting the commence message. With reference to FIG. 5A, beacon-signal processor 206 transmits a beacon-signal, respective of each node. With reference to FIG. 3, one example of such a forward transmission sequence may be as follows: Node 168 transmits first. Thereafter, the sequence of transmission is node 152, node 162, node 164, node 166, node 170, node 154, node 158, node 160 and node 156. After procedure 250, the method proceeds to procedures 252 and 254.

In procedure 252, the transmission time of the respective beacon signal, is recorded in each node. With reference to FIG. 5A, beacon-signal processor 206 records the transmission time of the beacon-signal respective of the node in time-records memory 208. After procedure 252, the method proceeds to procedures 256 and 264.

In procedure 254 the reception times of beacon-signals respective of other nodes, is recorded in each node. With reference to FIG. 5A, beacon-signal processor 206 records the reception times of the beacon-signal respective of other nodes in time-records memory 208. After procedure 254, the method proceeds to procedures 256 and 264.

In procedure 256, a reverse transmission sequence is determined according to the forward transmission sequence. With reference to FIG. 3, if, as in the example above, the forward transmission signal is node 168, node 152, node 162, node 164, node 166, node 170, node 154, node 158, node 160 and node 156, then the reverse transmission signal is node 156, node 160, node 158, node 154, node 170, node 166, node 164, node 162 node 152 and node 168.

In procedure 258, a beacon-signal, respective of each node is transmitted, of a plurality of network nodes according to the determined reverse transmission sequence. With reference to FIG. 5A, beacon-signal processor 206 transmits a beacon-signal, respective of each node. After procedure 258, the method proceeds to procedures 260 and 262.

In procedure 260, the transmission time of the respective beacon signal, is recorded in each node. With reference to FIG. 5A, beacon-signal processor 206 records the transmission time of the beacon-signal respective of the node in time-records memory 208.

In procedure 262 the reception times of beacon-signals, respective of other nodes, is recorded in each node. With reference to FIG. 5A, beacon-signal processor 206 records the reception times of the beacon-signal respective of other nodes in time-records memory 208.

In procedure 264, a forward propagation delay and a reversed propagation delay, respective of each pair of communicating nodes is determined according to the recorded times of transmissions and receptions of beacon signals. The forward and reverse propagation delays are determined according to equations (5) and (6). With reference to FIG. 5B, Propagation delays determinator 232 associates between time-records of each pair of communicating nodes and determines a forward propagation delay and a reversed propagation delay, respective of thereof.

In procedure 266, the propagation delay, between each pair of communicating nodes, is determined according to the forward propagation delay and reverse propagation delay respective of the each pair of communicating nodes. The propagation delay between each pair of communicating nodes is determined according to equation (7). With reference to FIG. 5B, Propagation delays determinator 232 determines the propagation delay between each pair of communicating nodes.

It will be appreciated by persons skilled in the art that the disclosed technique is not limited to what has been particularly shown and described hereinabove. Rather the scope of the disclosed technique is defined only by the claims, which follow.

The invention claimed is:

1. A method for determining the propagation delays between nodes in a network, the network including a plurality of nodes, the method comprising the procedures of:
 recording by each one of said nodes the transmission time of a beacon-signal respective of said one of said nodes and the reception times of other beacon-signals respective of other nodes, said beacon signal and said other beacon signals being transmitted according to a forward transmission sequence;
 determining a reverse transmission sequence according said forward transmission sequence;
 repeating said procedure of recording for beacon signals transmitted according to said reverse transmission sequence; and
 determining a propagation delay between each pair of communicating nodes according to a forward propagation delay and a reverses propagation delay respective of said each of pair of communicating nodes, said forward propagation delay and said reverse propagation delay being determined according to the recorded times of transmissions and receptions of said beacon signals by the respective nodes,
 wherein said pair of communicating nodes are defined as a pair of nodes that can receive transmissions of each other,
 and wherein the time difference between transmissions of beacon signals respective of two nodes, during said forward transmission sequence, is substantially the same as the time difference between transmissions of said beacon signals respective of said two nodes, during said reverse transmission sequence.

2. The method according to claim 1, further comprising the procedure of determining the distance between each pair of communicating nodes.

3. The method according to claim 2, further comprising the procedure of determining the location of each node in the network relative to other nodes according to said distance between each pair of communicating nodes.

4. The method according to claim 3, further comprising the procedure of determining the location of each node in the network relative to a geographical coordinate system according to said location of each node in the network relative to other nodes, and according to at least a known location of three of said nodes in said geographical coordinate system, and according to location information, relating to a fourth node, relative to said three of said nodes.

5. The method according to claim 1, further comprising the procedure of synchronizing the clocks of said nodes according to the recorded times of transmissions and receptions of said beacon signals, wherein said synchronizing includes determining the relative shift and the relative drift between said clocks of said nodes.

6. The method according to claim 1, wherein said forward transmission sequence is determined according to the allocated transmission time of each of said nodes in the network when said nodes transmit according to a TDMA scheme.

7. The method according to claim 1, wherein said forward transmission sequence is determined according to the identification representation respective of each node.

8. The method according to claim 1, wherein said forward transmission sequence is determined according to the hop distance between nodes.

9. The method according to claim 1, wherein said nodes transmit the respective beacon signals thereof according to a commence-message, transmitted by one of said nodes.

* * * * *